W. A. ORCUTT.
Lightning Rod.
No. 2,284.
Patented Oct. 9, 1841.
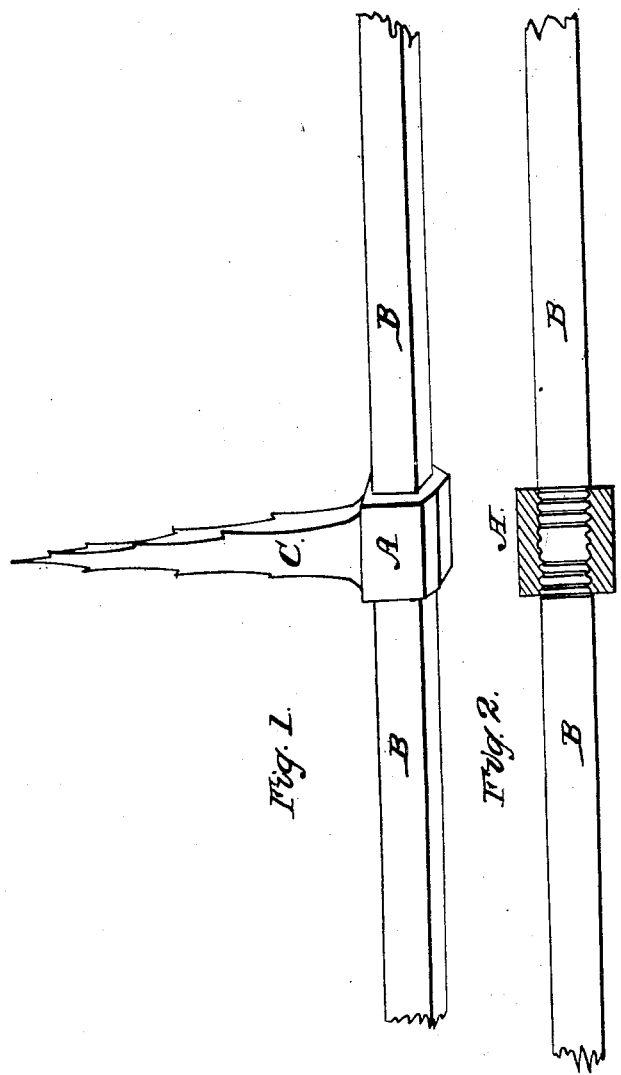

UNITED STATES PATENT OFFICE.

WM. A. ORCUTT, OF BOSTON, MASSACHUSETTS.

IMPROVEMENT IN THE MODE OF ATTACHING THE RECEIVING AND DISCHARGING POINTS OF LIGHTNING-CONDUCTORS.

Specification forming part of Letters Patent No. 2,284, dated October 9, 1841.

*To all whom it may concern:*

Be it known that I, WILLIAM A. ORCUTT, of Boston, in the county of Suffolk and Commonwealth of Massachusetts, electrician, have invented a new and useful improvement in the connection of lightning-conductors applied to buildings for their protection, and the application of the discharging and receiving points thereto; and I do hereby declare that the following is a full and exact description of the same, reference being to the accompanying drawings, which, taken in connection herewith, form my specification, setting forth the principles of my improvement, by which it may be distinguished from other inventions of a like character, and such parts or combinations thereof as 1 claim, and for which I solicit an exclusive privilege to be secured to me for fourteen years by Letters Patent.

My improvement consists in the method of connecting the rods, by means of a nut or hollow cylinder made of composition or other suitble metal, with the discharging and receiving point cast on the same, projecting at right angles thereto, into which nut the rods are inserted by means of a screw upon the end of each rod, turned into said nut or hollow cylinder in which the thread of a screw is cut.

Figure 1 represents two rods of a lightning-conductor connected in the manner proposed. A is the hollow cylinder, of metal, with the thread of a screw cut therein, into which the iron or copper rods B B are screwed. C is the discharging and receiving point, of composition or other suitable metal.

Fig. 2 represents a horizontal section of the nut A, exhibiting simply the mode of connection of the rods B B, without showing the points C.

The utility of my above-claimed invention consists in its forming the best combination of the most important requisites of lightning-conductors—viz., a perfect, close, and strong connection of the different rods; the presenting a great number of discharging and receiving points made of some metal little liable to oxidation; and, lastly, economy.

This method is superior to the usual one of pointing and bending one end of a rod at right angles to the rod, and passing this point through an eye turned on the end of the next rod, and securing both to the side of the building by a staple, inasmuch as the connection is closer, stronger, and not liable to be broken by the removal of the staple, and, also, in that by making the nut and point of a metal not liable to oxidation, while the rods are made of a cheaper metal, (like iron, liable to oxidation,) most of the advantages of the use of rods not liable to oxidation are secured with the cheapness of iron rods. It is superior to the mode of flattening and lapping the ends of the rods and screwing one end of the discharging and receiving point through the two, in that the connection is much closer and stronger, since in that mode the rods will become disconnected entirely in case the point should break, which, from the nature of the case, it is liable to, or should become a little unscrewed.

By adopting my mode the point is much less easily broken, and, if broken, the rods will remain as strongly connected as before.

What I claim as my invention is—

The method before described of connecting the rods of lightning-conductors, by means of a nut or hollow cylinder, with the receiving and discharging point cast thereon, as before described; but I expressly disclaim the invention of connecting rods of metal by a nut or hollow cylinder.

In testimony that the above is a true description of my said invention I have hereunto set my hand.

WM. A. ORCUTT.

Witnesses:
ISAAC AMES,
GEORGE MINOT.